Sept. 30, 1969  E. SCHRODER  3,469,798
CONTINUOUS DEPOSITION OF A STRING OF TURNS
OF WIRE UPON AN ENDLESS CONVEYOR
Filed Feb. 2, 1968  4 Sheets-Sheet 1
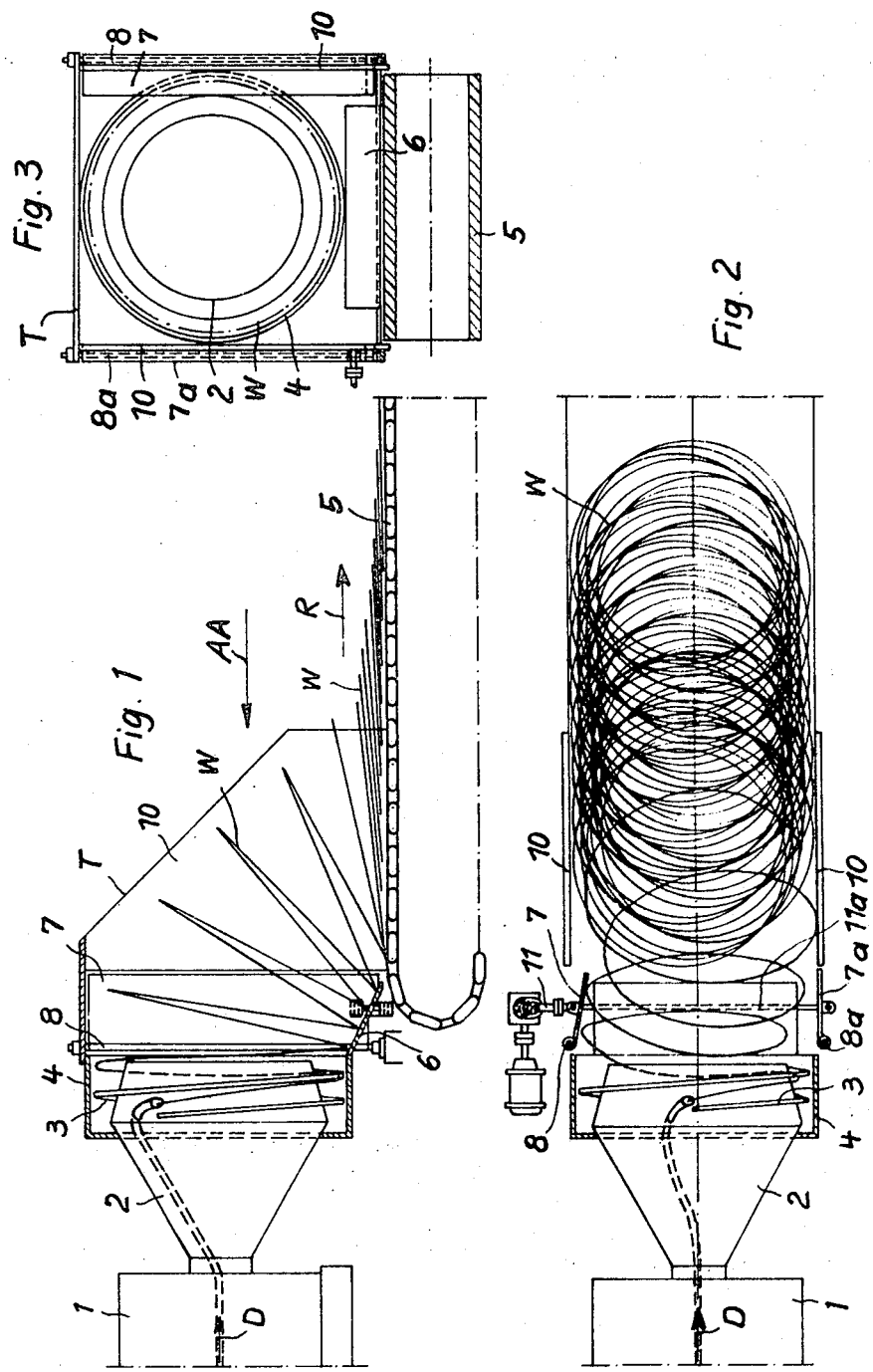
INVENTOR.
EGBERT SCHRODER
BY *Hancock, Downing & Seebold*
Attorneys Sept. 30, 1969      E. SCHRODER      3,469,798
CONTINUOUS DEPOSITION OF A STRING OF TURNS
OF WIRE UPON AN ENDLESS CONVEYOR
Filed Feb. 2, 1968      4 Sheets-Sheet 2
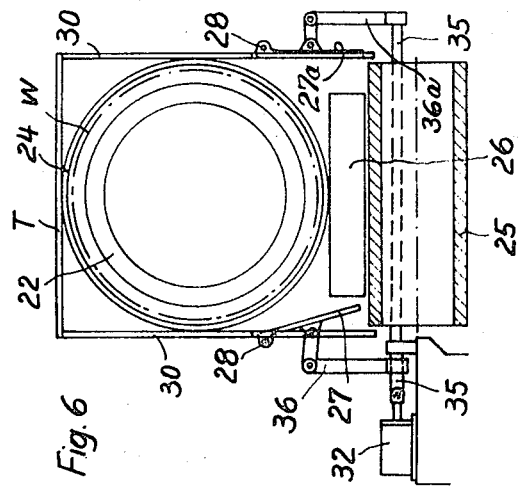
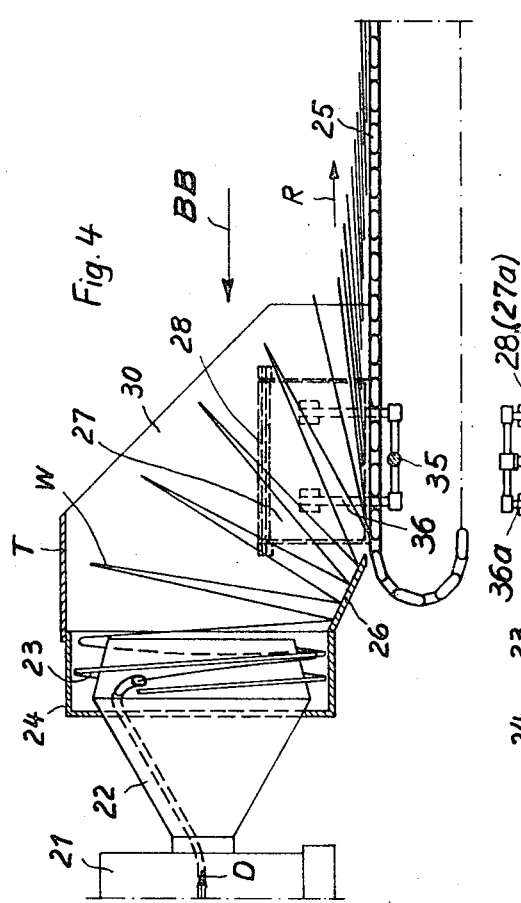
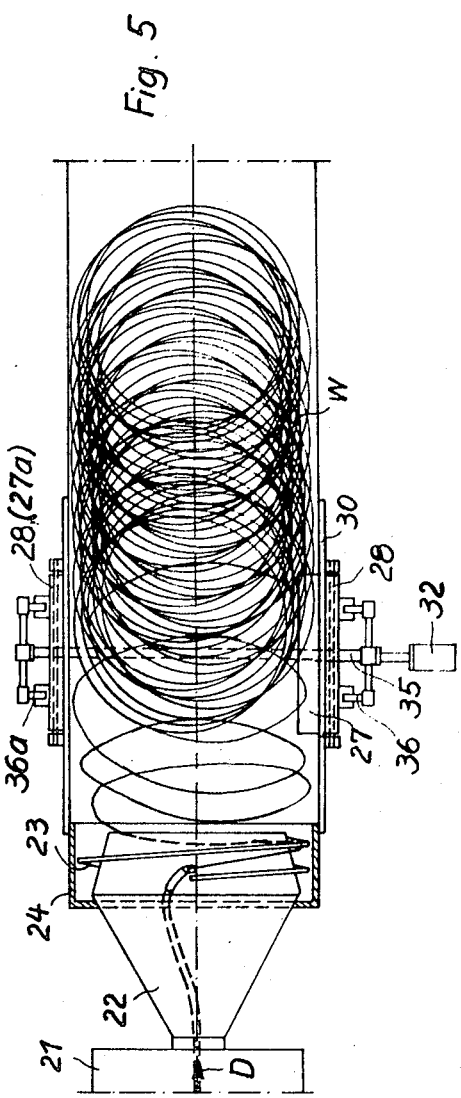
INVENTOR.
EGBERT SCHRODER

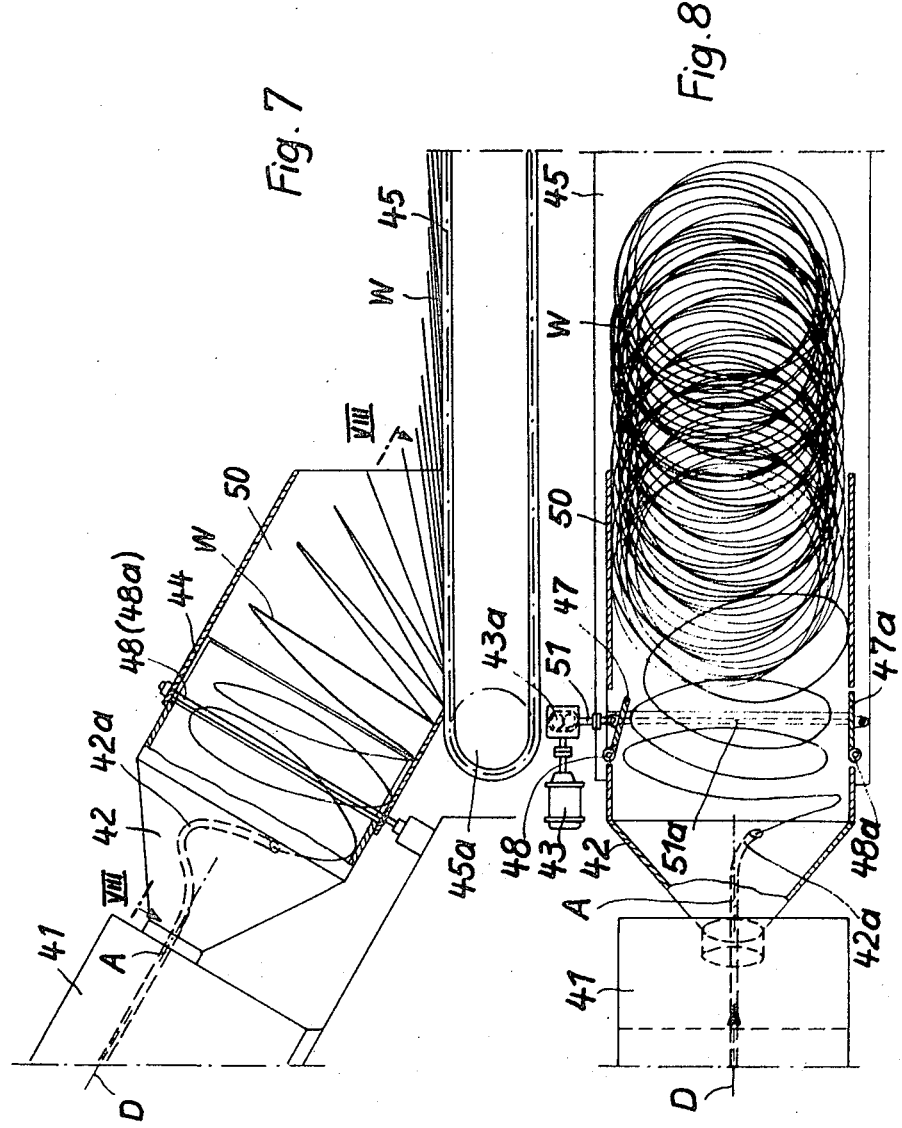

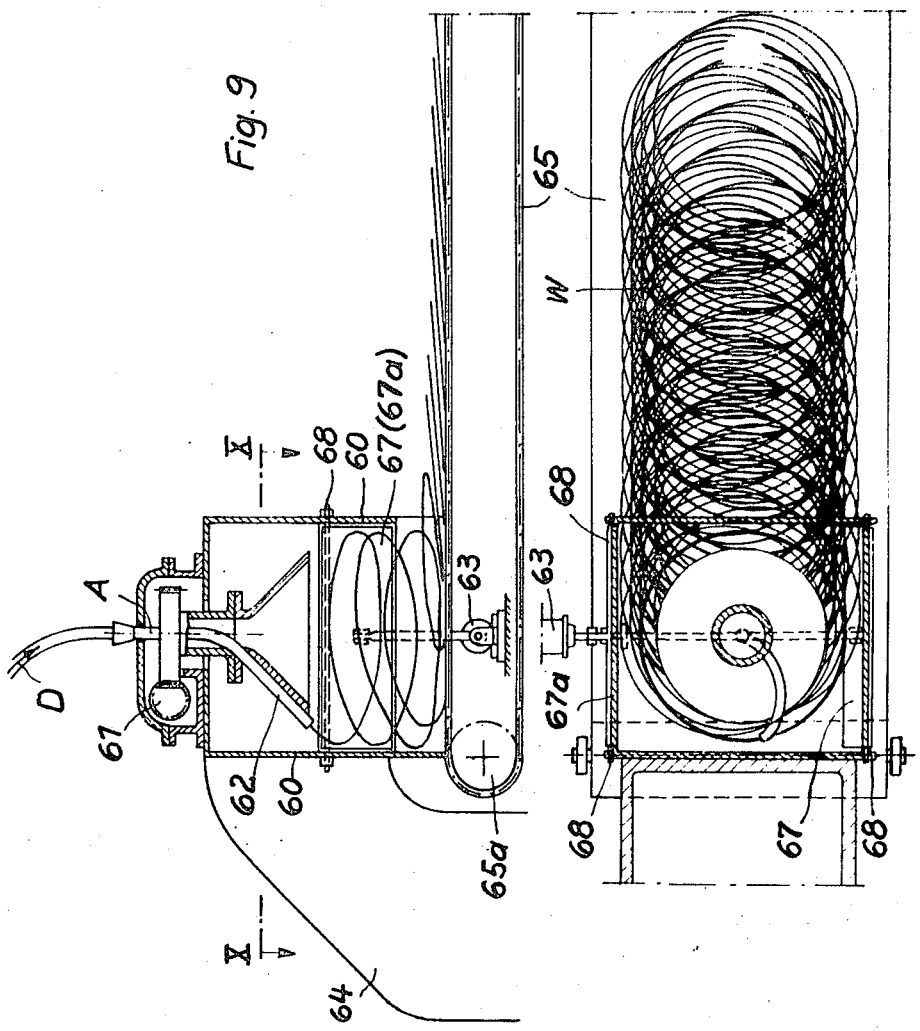

United States Patent Office 3,469,798
Patented Sept. 30, 1969

3,469,798
CONTINUOUS DEPOSITION OF A STRING
OF TURNS OF WIRE UPON AN ENDLESS
CONVEYOR
Egbert Schroeder, Lank, Germany, assignor to Schloemann Aktiengesellschaft, Dusseldorf, Germany, a company of Germany
Filed Feb. 2, 1968, Ser. No. 702,678
Claims priority, application Germany, Feb. 4, 1967,
Sch 40,176
Int. Cl. B21c 47/18
U.S. Cl. 242—83
16 Claims

ABSTRACT OF THE DISCLOSURE

An apparatus using a turn-layer device for producing the helix (Edenborn-reel type; rotatable laying cone with laying tube and worm thread) having the axis of the turn-layer either horizontal, vertical or oblique to the conveyor plane is used. At least one deflector flap having its pivotable axis either horizontal, vertical or oblique to the plane of the conveyor is provided to deflect either the individual turns or groups of turns in either one or both lateral directions with respect to the conveyor axis.

---

This invention relates to a method which renders it possible to draw apart laterally, by means of a relative movement imparted transversely to the direction of conveyance, the turns issuing from a turn-layer. These turns are deposited in overlapping relationship on a conveyor extending in a horizontal plane, in order to prevent local concentrations of material that would otherwise arise in the lateral sections.

It is known to wobble the turns, that is, to deposit them in different diameters by changing the peripheral speed of the turn layer. In this way, however, correctly positioned bunches cannot be formed from the turns of different sizes.

Furthermore it has already been proposed to cyclically move the turn-layer or the conveyor transversely to the direction of conveyance, to obtain a drawing apart of the turns.

It has been found that such a device is only suitable for obtaining the desired effect at relatively low speeds of conveyance. If such an effect is to be obtained, at rolling speeds of 50 metres per second for example, or more, it cannot be accomplished with the appliances known or proposed, since the masses to be moved are much too great, and are therefore too sluggish, to accomplish a quick and abrupt relative movement.

The object of the present invention is to enable the turns in such wire-treating installations to be drawn apart without disturbance, even at very high rolling speeds.

To attain the object set forth, a method for the continuous deposition of a string or series of turns of wire upon an endless conveyor is proposed, in which a lateral deflecting movement is imparted to the turns of wire during the falling movement between their issuance from the means forming the turns of wire and their deposition upon the conveying means. This lateral deflecting movement is directed transversely to the line of fall and to the direction of conveyance.

As a special advantage, the result is thus obtained that the fanned-out breadth of the turns of wire is increased considerably beyond the breadth of the conveying means, whereby the areas of potentially greater concentration of material are spread further apart, and the cooling conditions for the individual turns of wire are thereby improved. Furthermore the means employed for this purpose may be of comparatively small mass, and can therefore be operated at a high frequency. This renders it possible to influence each turn comprising wire, or small groups each of a few turns of wire, even at high rolling speeds.

In a further development of the method, the turns of wire may be deflected in one direction only, that is to say, a lateral deflecting means is arranged only on one side of the turns of wire.

According to this method the deflecting means may even execute an oscillating motion, and may thus deflect the turns of wire in one direction, then in the other, alternately. For this purpose, on each of the two sides, a deflecting means must be arranged which will impart to the turns of wire a deflecting movement to one side and then in the other direction alternately. If deflecting means are arranged on both sides of the wire the lateral deflection of the turns of wire upon the conveyor may be increased as compared with the use of only one deflecting means.

Embodiments of the invention are illustrated by way of example in the accompanying drawings, in which:

FIGURES 1, 2 and 3 show, respectively, in side elevation, in plan, and in front elevation, looking in the direction of the arrow A—A in FIGURE 1 a constructional example, with the deflector flaps arranged immediately behind the turn-layer;

FIGURES 4, 5 and 6 show, respectively, in side elevation, in plan, and in front elevation looking in the direction of the arrow B—B in FIGURE 4, a further constructional example of the invention, with deflector flaps directly on the side facing the conveyor.

FIGURE 7 shows in side elevation, partly in section, a further embodiment of the invention, with different means for forming the turns of wire, in an obliquely inclined arrangement;

FIGURE 8 shows this embodiment in plan, partly in section on the line VIII—VIII in FIGURE 7;

FIGURE 9 shows in side elevation, partly in section, a further embodiment of the invention, with a further means for forming the turns of wire, in a vertical arrangement; and FIGURE 10 shows this embodiment in plan on the line X—X in FIGURE 9.

In FIGURES 1 to 3, by 1 is denoted a drive for a turn-layer, which consists of a rotating laying cone 2, with a worm thread 3 secured thereto. In the turn-layer the rolled wire D, coming primarily from a rolling-mill train, is shaped in the rotating turn-layer head, its laying cone 2 and worm thread 3, into a string or series of turns of wire. The periphery of the worm thread 3 is bounded by a cylindrical casing 4. At the outlet end of the casing 4 is connected a closed tunnel T of box-like construction, which, with its guides 10, serves to carry over the series of turns of wire to an associated conveyor 5. The conveyor 5 is constructed as an endless chain belt, the conveying plane of which extends in a horizontal direction. The individual turns of wire W of the series of turns of wire come out of the turn-layer and stand with their lower sections upon a chute plate 6 where they are braked or retarded by friction, and consequently tilt down on to the conveyor 5. Since the latter is moving in the direction of arrow R, the turns of wire W pass continuously, in an overlapping arrangement, on to the conveyor 5.

As will be gathered more particularly from the plan view in FIGURE 2, a pair of deflector flaps 7, 7a movable about vertical axes 8, are attached, laterally of the turn-layer and directly connected thereto, adjacent the lateral guides 10 of the tunnel T. The deflector flaps 7 and 7a may be arranged on both sides, as illustrated, or upon one side only.

The driving of the deflector flaps 7, 7a to which a continuous rapid reciprocating motion is imparted by way of a rod-and-lever mechanism 11, may be effected by an eccentric drive, as shown, or pneumatically, or from an electrical reversing drive. By the quick and abrupt deflection of the turns of wire W, these turns of wire W are deposited upon the conveyor 5 in positions differing from one another due to the relative movement imparted by the deflector flaps 7 and 7a.

When two deflector flaps 7 and 7a, moved synchronously, are employed, a relative movement is imparted to the turns W at every change of direction, thus augmenting the effect as compared with the arrangement of only one deflector flap. The deflector flaps 7 and 7a are so arranged in the guides 10 that these, in their position of rest, do not disturb the advance of the turns of wire W. The plan view in FIGURE 2 illustrates the position of the overlapping turns lying upon the conveyor when a lateral relative movement has been imparted. With the deflector flaps 7 and 7a arranged on both sides, the movement of the flap 7 is transmitted to the flap 7a by way of a synchronising link 11a, which couples the deflector flap 7 to the deflector flap 7a.

The movement of the deflector flaps 7 and 7a is controllable to adapt it to the axial exit speed of the turns of wire W, for instance by the drive of the turn-layer being operatively connected with the drive of the deflector flaps 7 and 7a. In this way the adaptation of the movement of the deflector flaps 7 and 7a can be adjusted both to the rolling speed and to the diameter of the material. Furthermore, it is advisable to make the length of stroke of the linkage 11 variable, so as to enable the magnitude of the relative movement to be adapted to the cross-section of the material, for with thicker wire it is necessary to impart a greater relative movement than is required with thin wire.

In FIGURES 4 to 6, by 21 is denoted a drive for a turn-layer consisting of a rotating laying cone 22 and a worm thread 23 secured thereto. In the turn-layer 22 the rolled wire D, coming primarily from a rolling-mill train not illustrated, is shaped into a string or series of turns of wire W by depositing with the rotating turn-layer head, its laying cone 22 and worm thread 23. The periphery of the worm thread 23 is bounded by a cylindrical casing 24. To the exit end of this casing is connected a closed tunnel T of box-like construction, which, with its lateral guides 30, serves for guiding the series of turns of wire to a conveyor 25 connected therewith. The conveyor 25 is constructed, for example, as an endless chain belt, the conveying plane of which extends in a horizontal direction. The individual turns of wire W of the series come from the turn-layer with their lower sections standing upon a chute-plate 26. They are braked by friction against this chute-plate and consequently tilt down on to the conveyor 25. Since the latter is moving in the direction of arrow R, the turns of wire W pass continuously on to the conveyor 25 in an overlapping arrangement. As can be seen more particularly from the side view in FIGURE 4 and from the front view in FIGURE 6, a deflector flap 27, movable about a horizontal pivotal axis 28 to one side of the turn-layer and above the level of the conveyor 25, is positioned in one of the lateral guides 30 of the tunnel T. As represented in broken lines in FIGURES 4 to 6, deflector flaps 27 and 27a may be arranged on the guides 30, one on each side.

The deflector flaps 27 and 27a, illustrated in the drawings on one side, or on both sides, are preferably mounted in the guides 30 on both sides, since in this way, upon the reversal of the deflector flaps 27 and 27a, a relative motion is imparted to the turns of wire W in both directions. In the two-sided arrangement, the position of the deflector flaps 27 and 27a is such that one deflector flap 27 deflects the turns of wire W towards the opposite side of the conveyor transversely to the direction of conveyance, whilst the other deflector flap, 27a, forms an extension of the lateral guiding wall 30. As illustrated, it is likewise possible to work with only one deflector flap 27, provided the latter effects a sufficient deflection of the turns of wire W. The driving of the deflector flap 27 is here effected, as diagrammatically indicated, by means of a pneumatic cylinder 32, by means of tension rodding 35, 36, 36a. This renders possible a rapid reciprocation of the deflector flap 27, since the mass of the latter is extremely small. At the moment of the outward swing of the deflector flap 27, the turns of wire are pushed over toward the other side of the casing, and are thus deposited in staggered or offset relationship to the centre line of the conveyor.

Instead of the pneumatic displacement drive of the deflector flap 27, the latter may likewise be moved by way of a rod-and-lever mechanism, by means of a crank drive, or by an electrical reversing drive.

The special advantage of such a device resides in the fact that to the turns of wire W, by the arrangement of the deflector flaps 27 and 27a directly above the conveyor 25, the lateral relative motion for the deflection is first imparted to the turns of wire immediately before their impact upon the conveyor 25, so that the turns of wire W no longer have the opportunity, owing to the series of turns of wire hanging together, of returning into their line of fall as given from the turn-layer. Advantageously the side edges of the deflector flaps 27 and 27a may be bent outwards, in order to obviate any possibility of disturbance by the turns of wire W bearing on or catching in one another.

In FIGURES 7 and 8 the means forming the turns of wire likewise consists of a rotating laying cone 42, rotationally driven by a drive 41, there being machined in the periphery of the laying cone a groove 42a in the form of a laying tube, which serves for guiding the wire. The wire D runs in along the pivotal axis of the laying cone 42, which is arranged at an inclination to the conveyor 45, which removes the recumbent turns of wire. The turns of wire W formed in the laying cone 42 are carried over within lateral guiding walls 50 on to an endless conveyor 45, which passes round reversing rollers 45a. Into the guiding walls 50 are positioned deflector flaps 47, 47a, rockable about hinges 48 arranged at right angles to the pivotal axis A of the laying cone 42. The deflector flaps, as already described, impart to the turns of wire W a relative motion directed laterally towards the line of fall, so as to increase the lateral dispersion of the turns of wire W as they come to rest upon the conveyor 45. The deflector flaps 47 and 47a turn about hinges 48 and 48a. The rocking movement is effected by way of rodding 51, 51a. The stroke adjustment may be effected for instance by way of a continuously adjustable transmission 43a. The drive 43 of the deflector flaps 47 and 47a is effected in the manner hereinbefore described by means of an eccentric or pneumatic stroke drive. It is also possible to employ a deflector flap 47 or 47a arranged on one side only, as previously described, which imparts to the turns of wire W a deflecing movement towards one side only; or a pair of deflector flaps 47, 47a may be employed, which imparts a deflection to the turns of wire towards one side or the other alternately, and thus doubles the dispersing action of the turns of wire W upon the conveyor 45 as compared with the one-sided arrangement of the deflector flap.

In FIGURES 9 and 10 is illustrated a further constructional example of the means forming the turns of wire. This means consists of a rotating laying tube 62, which is driven by a rotary drive 61, and in which the wire D is guided, in the manner that is known from the wire reels of the Edenborn type. The structure is supported by a stand 64. The pivotal axis A of the laying tube 62 is arranged vertically so that the turns of wire W formed by the laying tube 62 fall directly on to an endless conveyor 65, passing around reversing rollers 65a. Just as in the preceding constructional examples, the turns of wire W are guided over within guiding walls 60 on to the conveyor 65. Into the lateral guiding walls 60, transversely to the direction of motion of the conveyor 65, deflector flaps 67 and 67a can swing about pivotal axes or hinges 68, horizontally arranged at right angles to the pivotal axis A of the laying tube 62, on one side or on both sides in the guiding walls 60, whereby a deflecting movement is imparted to the turns of wire W moving in the line of fall, either towards one side only or towards one side and the other side alternately. The rocking drive of the deflector flaps 67, 67a is effected by way of a rotary drive 63 or by way of a continuously variable transmission, as previously described.

All three constructions of the means forming the turns of wire may be arranged with their axes of rotation horizontal, as in FIGURES 1 to 6, obliquely inclined to the plane of conveyance, as in FIGURES 7 and 8, or vertical as in FIGURES 9 and 10.

It is the idea of the present invention to combine at will the means described for forming the turns of wire, with the various horizontal, vertical or inclined arrangements of the apparatus, and with the various constructional examples of the position of the deflector flaps.

I claim:

1. A method of laying a continuous series of turns of wire upon a conveyor having an approximately horizontal conveyor plane, comprising the steps of introducing wire to a turn-layer for forming said wire into helical turns having a common longitudinal central axis, and imparting a lateral movement to the turns at their lateral portions by at least one pivotable deflector flap located between said turn-layer and said conveyor to cause the turns to laterally deviate from said central axis as they fall onto said conveyor.

2. A method as claimed in claim 1 wherein said lateral movement is imparted in but one direction laterally of the conveying direction.

3. A method as claimed in claim 1 wherein said lateral movement is imparted successively in both directions laterally of the conveying direction.

4. Apparatus for laying a continuous series of turns of wire upon an approximately horizontal conveyor plane comprising means to provide wire, a turn-layer device for forming said wire into helical turns having a common longitudinal central axis, and at least one pivotable deflector flap located between said turn-layer and said conveyor to impart a lateral movement to the lateral portions of the turns to cause them to laterally deviate from said central axis as they fall onto the conveyor.

5. Apparatus as claimed in claim 4 wherein said deflector flap is laterally adjacent said turns and its pivotal axis is normal to said central axis.

6. Apparatus as claimed in claim 4 wherein said deflector flap is laterally adjacent said turns and its pivotal axis is approximately horizontal.

7. Apparatus as claimed in claim 4 wherein said turn-layer device comprises a rotating laying tube with a wire guide therein.

8. Apparatus as claimed in claim 4 wherein said turn-layer device is of the Edenborn-reel type.

9. Apparatus as claimed in claim 4 wherein said turn-layer device comprises a rotatable laying cone having a worm thread provided on its periphery and a laying tube secured within said laying cone such that when the wire is introduced into said laying tube it exits into said worm thread.

10. Apparatus as claimed in claim 4 wherein the axis of said turn-layer device is approximately horizontal.

11. Apparatus as claimed in claim 4 wherein the axis of said turn-layer device is approximately vertical.

12. Apparatus as claimed in claim 4 wherein the axis of said turn-layer device is oblique in relations to said conveyor plane.

13. Apparatus as claimed in claim 14 wherein said deflector flap has an eccentric drive means, a guide wall is positioned between said turn-layer device and said conveyor, and said deflector flap is arranged within and flush with said guide wall then inoperative.

14. Apparatus as claimed in claim 13 wherein the drive means is pneumatic.

15. Apparatus as claimed in claim 4 wherein a guide wall is positioned intermediate said deflector flap and said conveyor, and when inoperative said flap is flush with said guide wall.

16. Apparatus as claimed in claim 4 wherein a guide wall is positioned between said turn-layer device and said conveyor, said deflector flap is arranged within said guide wall immediately above said conveyor, and when said flap is inoperative it is flush with said wall.

References Cited

UNITED STATES PATENTS

| | | | |
|---|---|---|---|
| 2,954,180 | 9/1960 | Crum | 242—83 |
| 3,405,885 | 10/1968 | Schroder | 242—83 |

NATHAN L. MINTZ, Primary Examiner